(12) United States Patent
Kim et al.

(10) Patent No.: US 9,431,930 B2
(45) Date of Patent: Aug. 30, 2016

(54) EMERGENCY STOP METHOD FOR HYBRID CONSTRUCTION EQUIPMENT AND BRAKE CONTROL DEVICE

(71) Applicant: DOOSAN INFRACORE CO., LTD., Incheon (KR)

(72) Inventors: Sang Il Kim, Gyeonggi-do (KR); Kyeong Keun Kim, Gyeonggi-do (KR); Byung Il Kang, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 77 days.

(21) Appl. No.: 14/369,562

(22) PCT Filed: Dec. 27, 2012

(86) PCT No.: PCT/KR2012/011543
§ 371 (c)(1),
(2) Date: Jun. 27, 2014

(87) PCT Pub. No.: WO2013/100617
PCT Pub. Date: Jul. 4, 2013

(65) Prior Publication Data
US 2015/0042259 A1    Feb. 12, 2015

(30) Foreign Application Priority Data

Dec. 28, 2011  (KR) .................. 10-2011-0144034
Dec. 28, 2011  (KR) .................. 10-2011-0144035

(51) Int. Cl.
*H02P 3/14*    (2006.01)
*B60T 1/06*    (2006.01)
(Continued)

(52) U.S. Cl.
CPC ............... *H02P 3/14* (2013.01); *B60T 1/062* (2013.01); *E02F 9/128* (2013.01); *E02F 9/2095* (2013.01); *E02F 9/226* (2013.01); *E02F 9/268* (2013.01)

(58) Field of Classification Search
CPC ............ H02P 3/14; E02F 9/128; B60K 6/46; B60K 6/48; B60L 11/08; F16H 61/061; F15B 11/006; B23Q 7/005

USPC .......... 318/703; 701/22, 50; 322/14; 477/95; 137/561 R; 198/346.1
See application file for complete search history.

(56) References Cited

U.S. PATENT DOCUMENTS 5,231,898 A * 8/1993 Okura .................. F16H 61/061
                                                      477/95
8,626,403 B2 * 1/2014 Onsager ................. B60L 11/08
                                                      180/65.265
(Continued)

FOREIGN PATENT DOCUMENTS

CN  101408213 A   4/2009
CN  102219017 A   10/2011
(Continued)

OTHER PUBLICATIONS

Search Report dated Apr. 25, 2013 and written in Korean with English translation for International Patent Application No. PCT/KR2012/011543 filed Dec. 27, 2012, 5 pages.
(Continued)

*Primary Examiner* — Yuri Kan
(74) *Attorney, Agent, or Firm* — John D. Veldhuis-Kroeze; Westman, Champlin & Koehler, P.A.

(57) ABSTRACT

The present disclosure relates to an emergency stop method for hybrid construction equipment and a brake control device, and more particularly, to an emergency stop method for hybrid construction equipment and a brake control device, which may confirm a failure occurrence location of the hybrid construction equipment, absorb inertial energy of the swing body using several functions for each generated failure location so as to stably stop the swing body in an emergency manner, and when the failure occurs in the hybrid construction equipment, create the brake pattern by using the swing speed or the front information, control a brake of the swing body by controlling a voltage control valve or a hydraulic valve in accordance with the created brake pattern, such that a user may smoothly stop the swing body in accordance with a desired stop speed profile.

3 Claims, 15 Drawing Sheets

(51) Int. Cl.
*E02F 9/12* (2006.01)
*E02F 9/22* (2006.01)
*E02F 9/26* (2006.01)
*E02F 9/20* (2006.01)

(56) References Cited

U.S. PATENT DOCUMENTS

| | | | | |
|---|---|---|---|---|
| 2002/0195312 A1* | 12/2002 | Tonnigs | ............... | B23Q 7/005 198/346.1 |
| 2010/0097037 A1* | 4/2010 | Morinaga | ............... | B60K 6/46 322/14 |
| 2011/0251746 A1* | 10/2011 | Wu | ............... | B60K 6/48 701/22 |
| 2013/0042935 A1* | 2/2013 | Post | ............... | F15B 11/006 137/561 R |
| 2013/0245899 A1* | 9/2013 | Lee | ............... | E02F 9/128 701/50 |

FOREIGN PATENT DOCUMENTS

| | | |
|---|---|---|
| EP | 1731680 A1 | 12/2006 |
| JP | 2005-290902 | 10/2005 |
| JP | 2007-204924 | 8/2007 |
| JP | 2008-211964 A | 9/2008 |
| JP | 2010-116760 A | 5/2010 |
| JP | 2010-131656 | 6/2010 |
| JP | 2010-133236 A | 6/2010 |
| JP | 2010133238 A | 6/2010 |
| JP | 2010-156395 | 7/2010 |
| JP | 4608384 | 1/2011 |
| KR | 10-2002-0073795 | 9/2002 |
| WO | 2011078587 A2 | 6/2011 |

OTHER PUBLICATIONS

Chinese Office Action dated Aug. 5, 2015 for Chinese Application No. 201280065280.3, 7 pages.
European Search Report dated Dec. 14, 2015 for European Application No. 12863157.9, 6 pages.

* cited by examiner

EMERGENCY STOP METHOD FOR HYBRID CONSTRUCTION EQUIPMENT AND BRAKE CONTROL DEVICE

CROSS-REFERENCE TO RELATED APPLICATION

This Application is a Section 371 National Stage Application of International Application No. PCT/KR2012/011543, filed Dec. 27, 2012 and published, not in English, as WO 2013/100617 on Jul. 4, 2013.

FIELD OF THE DISCLOSURE

The present disclosure relates to an emergency stop method for hybrid construction equipment and a brake control device, and particularly, to an emergency stop method for hybrid construction equipment and a brake control device, which may stably stop a swing body in an emergency manner body by confirming a failure occurrence location of hybrid construction equipment, and absorbing inertial energy of the swing body using several functions for each generated failure location, and may smoothly stop the swing body by determining a brake pattern in a case in which an emergency stop needs to be performed, and controlling a hydraulic brake in accordance with the determined brake pattern.

BACKGROUND OF THE DISCLOSURE

Recently, researches on hybrid type construction equipment, which improves fuel efficiency by storing surplus power of an engine in a battery, and supplying power from the battery to the engine that does not have sufficient power so as to cope with a rapid increase in oil price, are being actively conducted.

A system, which uses the engine and an electric motor as a common power source as described above, and has an electrical energy storage device, is referred to as a hybrid system. For example, as the hybrid system, there is a hybrid system for heavy equipment such as a hybrid vehicle, and an excavator.

FIG. 1 is a configuration diagram of an electric power conversion device for general hybrid construction equipment.

As illustrated in FIG. 1, an electric power conversion device for hybrid construction equipment includes an engine auxiliary motor 110, an engine side inverter 111, a swing motor 120 having a brake, a swing side inverter 121, an ultracapacitor 130, and a converter 131.

The engine side inverter 111 operates the engine auxiliary motor 110 using a motor or an electric generator.

The swing motor 120 operates an upper swing body of a hybrid excavator. The swing side inverter 121, which operates the swing motor 120, performs an acceleration operation and a deceleration operation depending on lever control by a user who manipulates the hybrid excavator. The swing side inverter 121 operates the swing motor 120 using a motor at the time of an acceleration operation. In contrast, the swing side inverter 121 operates the swing motor 120 using an electric generator at the time of a deceleration operation. That is, the swing side inverter 121 converts rotational inertial energy of the upper swing body of the hybrid excavator into electrical energy.

The ultracapacitor 130 serves to store electrical energy, and is connected with the converter 131 that controls a charge operation and a discharge operation.

FIG. 2 is a flowchart of an exemplary embodiment regarding a failure occurrence process in an electric power conversion device for general hybrid construction equipment.

As illustrated in FIG. 2, the electric power conversion device in the related art stops all operations when failure occurs in the electric power conversion device (S202).

Specifically, the electric power conversion device turns off the engine side inverter 111 of the engine auxiliary motor 110 (S202). In addition, the electric power conversion device turns off the swing side inverter 121 of the swing motor 120 (S206). Next, the swing motor 120 undergoes a regeneration process of the swing motor 120 (S208), and Vdc is in an overvoltage state (S210). In addition, the electric power conversion device turns off the converter 131 at the ultracapacitor (UC) 130 side (S212).

As described above, in the hybrid excavator, the upper swing body is freely rotated before a braking operation when the electric power conversion device is stopped, unlike a hydraulic excavator, and thus there is a problem in that a risk of an accident is greatly increased in this case. When the swing body is continuously rotated, there is a problem in that a peripheral area of the work environment may be damaged.

In order to reduce the aforementioned damage, the rotation of the swing body is blocked, and a swing brake is operated until inertial energy is exhausted. A brake control manner in the related art produces a brake off command when a swing speed is a predetermined value or less. The hydraulic brake is operated with a predetermined delay after the brake off command is generated. In this case, there is a problem in that when the braking operation is immediately performed using a mechanical swing brake in a case in which a large amount of inertial energy remains because a speed of the swing body is high immediately before failure occurs, impact may be applied to a user, and the excavator may be turned over on a slope.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in consideration of the aforementioned problem, and an object of the present disclosure is to provide an emergency stop method for hybrid construction equipment, which may absorb inertial energy of a swing body by confirming a failure occurrence location of hybrid construction equipment and using several functions for each generated failure location, thereby stably stopping the swing body in an emergency manner.

Meanwhile, the present disclosure has been made in consideration of the aforementioned problem, and another object of the present disclosure is to provide a brake control device for construction equipment, by which a user may smoothly stop a swing body in accordance with a desired stop speed profile by creating a brake pattern from a swing speed or front information when failure occurs in hybrid construction equipment, and by controlling a brake operation of the swing body by controlling a voltage control valve or a hydraulic valve in accordance with the created brake pattern.

To this end, a method according to the present disclosure includes: confirming a failure occurrence location at a swing side, an engine side, and an ultracapacitor side of the hybrid construction equipment; turning off an inverter or a converter connected with the confirmed failure occurrence location; and operating the inverter or the converter at a location that is not the confirmed failure occurrence location, and absorbing inertial energy of a swing body through an ultracapacitor or an engine auxiliary motor so as to perform an emergency stop.

To this end, a device according to the present disclosure includes: a brake for stopping a swing body when failure occurs in the construction equipment; a drive valve which is formed in a hydraulic manner or a voltage controlled manner, and controls pressure or an amount of fluid applied to the brake; and a control unit which determines a brake pattern using front information or a swing speed of the swing body, and controls the drive valve while creating a voltage control signal or a hydraulic pressure control signal so that the swing body is stopped depending on the determined brake pattern.

The present disclosure has an effect in that inertial energy of the swing body is absorbed by confirming a failure occurrence location of the hybrid construction equipment and using several functions for each generated failure location, thereby stably stopping the swing body in an emergency manner.

In addition, the present disclosure has an effect in that a user may quickly cope with a situation after the emergency stop by displaying the failure occurrence location and the emergency stop situation to the user.

In addition, the present disclosure has an effect in that impact to the user at the time of braking may be reduced because of a stable emergency stop of the swing body, and a risk of turning over the construction equipment when the construction equipment is located on a slope may be reduced.

Meanwhile, the present disclosure has an effect in that the user may smoothly stop the swing body in accordance with a desired stop speed profile by creating a brake pattern using a swing speed or front information when failure occurs in the hybrid construction equipment, and by controlling the brake operation of the swing body by controlling a voltage control valve or a hydraulic valve in accordance with the created brake pattern.

That is, the present disclosure has an effect in that the user may smoothly stop the swing body using the desired stop speed profile by controlling the hydraulic valve in a pulse width modulation manner. In addition, the present disclosure has an effect in that the user may select or calculate a desired brake pattern using the voltage control valve, and smoothly stop the swing body.

In addition, the present disclosure has an effect in that the brake control device may be simplified because the swing body may be stopped in an emergency manner without using an additional device such as an orifice in the related art, and the swing body may be stopped with various brake patterns by monitoring the front information or the swing speed.

Furthermore, the present disclosure has an effect in that impact to the user at the time of braking may be reduced because of a stable emergency stop of the swing body, and a risk of turning over the construction equipment when the construction equipment is located on a slope may be reduced.

DESCRIPTION OF MAIN REFERENCE NUMERALS OF DRAWINGS

Figure 1:
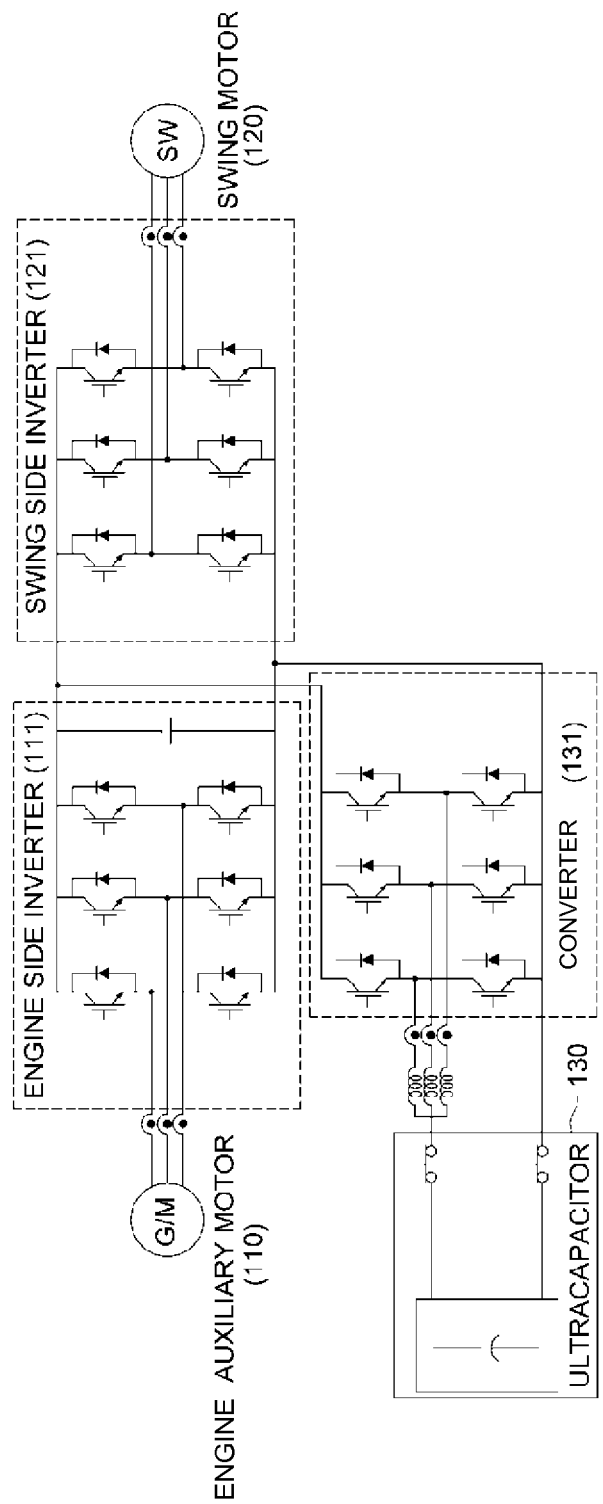
FIG. 1 is a configuration diagram of an electric power conversion device of general hybrid construction equipment.
Figure 2:
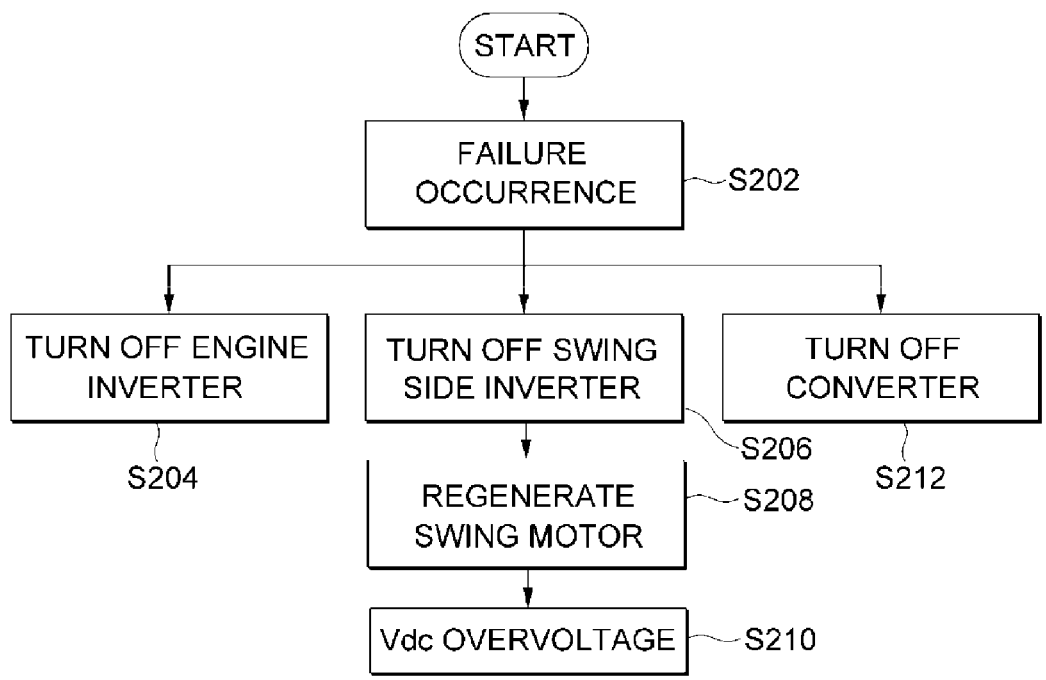
FIG. 2 is a flowchart of an exemplary embodiment regarding a failure occurrence process in the electric power conversion device of the general hybrid construction equipment.

110: Engine auxiliary motor
111: Engine side inverter
120: Swing motor
121: Swing side inverter
130: Ultracapacitor
131: Ultracapacitor side converter
1400: Brake control device
1410: Brake
1420: Drive valve
1421: Hydraulic valve
1422: Voltage control valve
1430: Control unit

DETAILED DESCRIPTION

Hereinafter, an exemplary embodiment according to the present disclosure will be described in detail with reference to the accompanying drawings. A configuration of the present disclosure and an operation and an effect according to the configuration of the present disclosure will be clearly understood by the detailed description below. In the following detailed description, it should be noted that the same elements will be designated by the same reference numerals even though the elements are illustrated in different drawings, and a detailed explanation of publicly known related configurations may be omitted so as to avoid unnecessarily obscuring the subject matter of the present disclosure.

Figure 3:
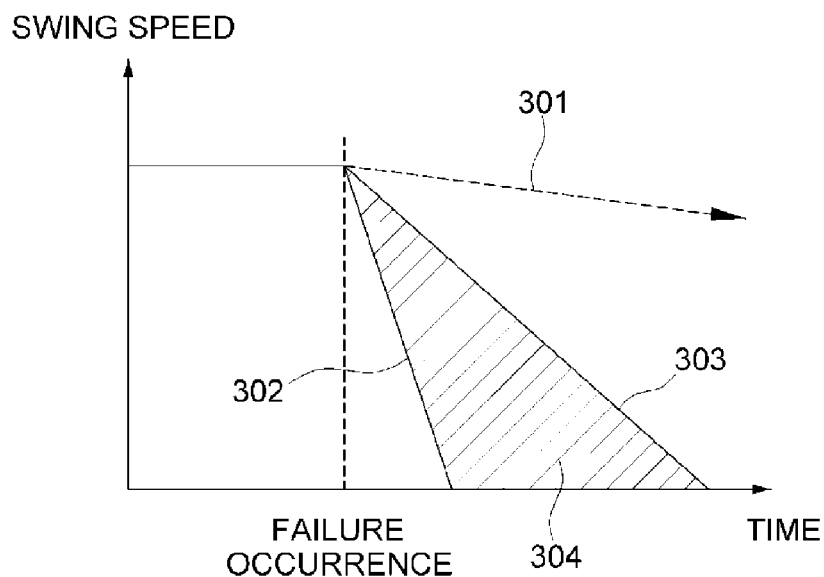
FIG. 3 is an exemplified view of an exemplary embodiment regarding a deceleration graph for comparing swing speeds between the related art and the present disclosure.

FIG. 3 is an exemplified view of an exemplary embodiment regarding a deceleration graph for comparing swing speeds between the related art and the present disclosure.

When failure occurs in an electric power conversion device in the related art, a swing body is rotated while inertial energy is consumed as frictional energy such that the swing body is not quickly stopped, as indicated by reference numeral 301.

On the contrary, in the present disclosure, when failure occurs at an engine side of an electric power conversion device, the electric power conversion device charges an ultracapacitor 130 with inertial energy using a swing side inverter 121 and an ultracapacitor side converter 131 so as to absorb the inertial energy. A swing speed characteristic at this time is indicated by reference numeral 302.

In addition, when failure occurs at the ultracapacitor side, the electric power conversion device consumes the inertial energy using the swing side inverter 121 and an inverter 111 of an engine auxiliary motor 110 side. A swing speed characteristic at this time is indicated by reference numeral 303.

In addition, the electric power conversion device may allow the swing body to be stopped by further using a mechanical hydraulic brake in order to allow the swing body to be more quickly stopped while consuming the inertial energy using the swing side inverter 121 and the inverter 111 of the engine auxiliary motor 110 side. A swing speed characteristic region at this time is indicated by reference numeral 304.

As such, the electric power conversion device of the present disclosure confirms a failure occurrence location at the swing side, the engine side, or the ultracapacitor side of the hybrid construction equipment. That is, the electric power conversion device confirms engine side failure (failure in the engine auxiliary motor 110 or the engine side inverter 111), swing side failure (failure in the swing motor 120 or the swing side inverter 121), and ultracapacitor side failure (failure in the ultracapacitor 130 or the ultracapacitor side converter 131). Further, the electric power conversion device turns off the inverter or the converter that is connected with the confirmed failure occurrence location. In addition, the electric power conversion device operates the inverter or the converter at a location that is not the confirmed failure occurrence location, and absorbs the inertial energy of the swing body so as to perform an emergency stop. That is, the electric power conversion device distinguishes the failure occurrence location, and may safely stop the swing body in an emergency situation using some of the inverters or the converters instead of turning off all of the operations.

Hereinafter, emergency stop processes at the time of the engine side failure, the swing side failure, and the ultracapacitor side failure will be described in detail.

Figure 4:
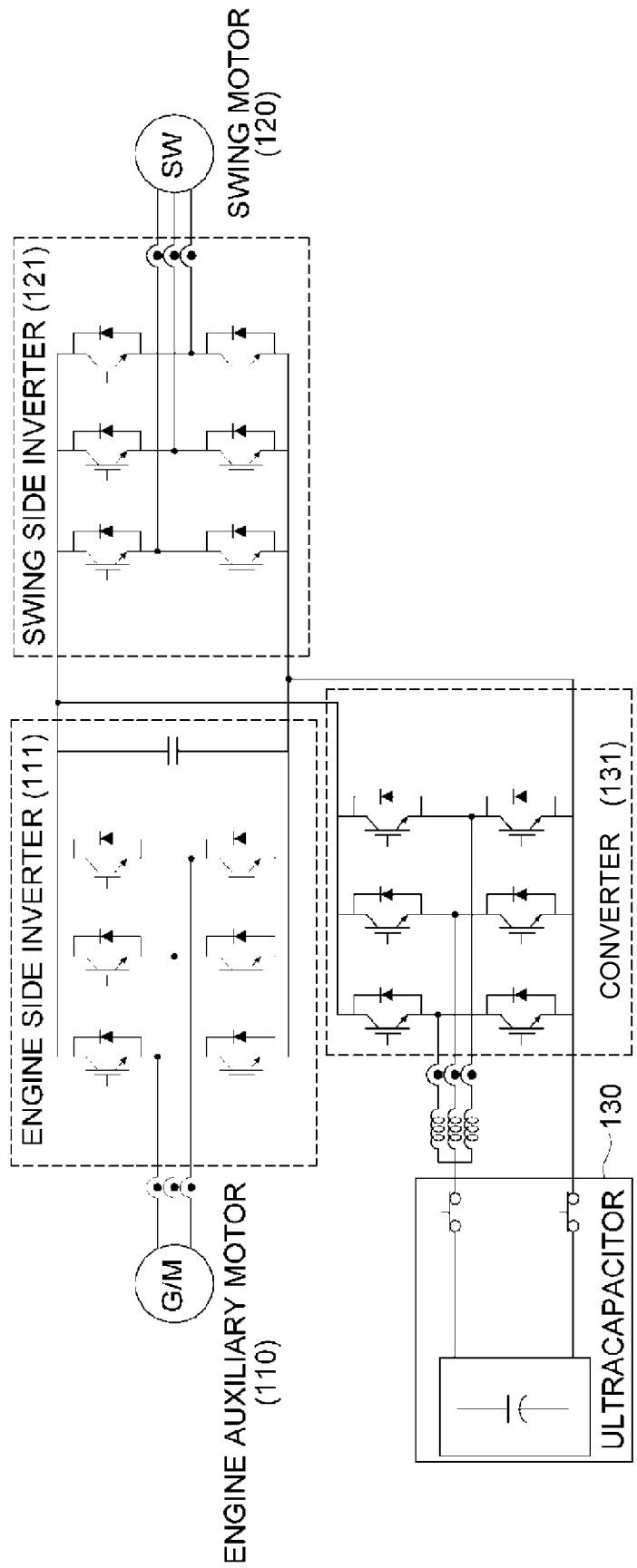
FIGS. 4 and 5 are an explanatory view and a flowchart of a first exemplary embodiment regarding an emergency stop process at the time of swing side failure according to the present disclosure.
Figure 5:
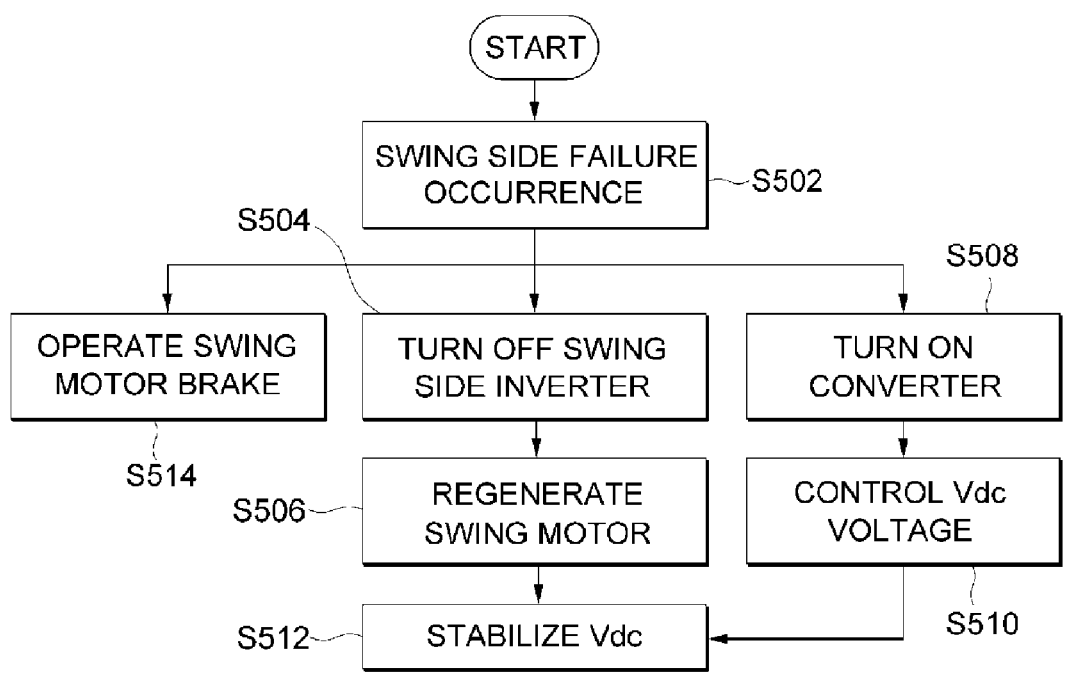

FIGS. 4 and 5 are an explanatory view and a flowchart of a first exemplary embodiment regarding an emergency stop process at the time of the swing side failure according to the present disclosure.

As illustrated in FIGS. 4 and 5, the electric power conversion device confirms that the swing side failure (failure in the swing motor 120 or the swing side inverter 121) occurs (S502).

Further, the electric power conversion device turns off the swing side inverter 121 in which failure has occurred (S504). In this case, the swing motor 120 is regenerated due to the inertial energy of the swing body (S506).

In addition, in the first exemplary embodiment, the electric power conversion device turns off the engine side inverter 111, and operates the ultracapacitor side converter 131 (S508). Next, the electric power conversion device performs Vdc voltage control of the ultracapacitor side converter 131 (S510), and stores the inertial energy of the swing body in the ultracapacitor 130. Accordingly, the electric power conversion device absorbs the inertial energy of the swing body while stabilizing Vdc (S512).

Meanwhile, in order to reduce time for deceleration of the swing body, the electric power conversion device may operate the mechanical hydraulic brake, which is provided in the swing motor 120, so as to allow the swing body to be stopped (S514).

Figure 6:
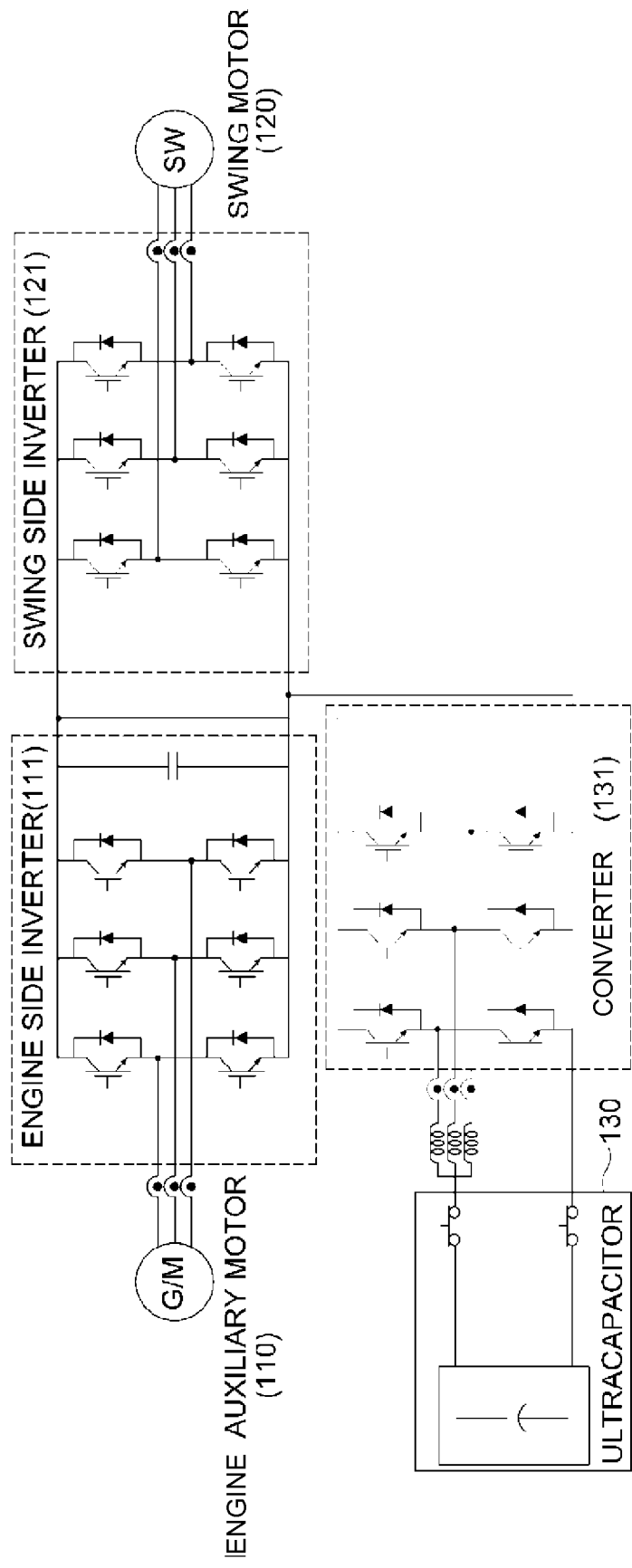
FIGS. 6 and 7 are an explanatory view and a flowchart of a second exemplary embodiment regarding an emergency stop process at the time of swing side failure according to the present disclosure.
Figure 7:
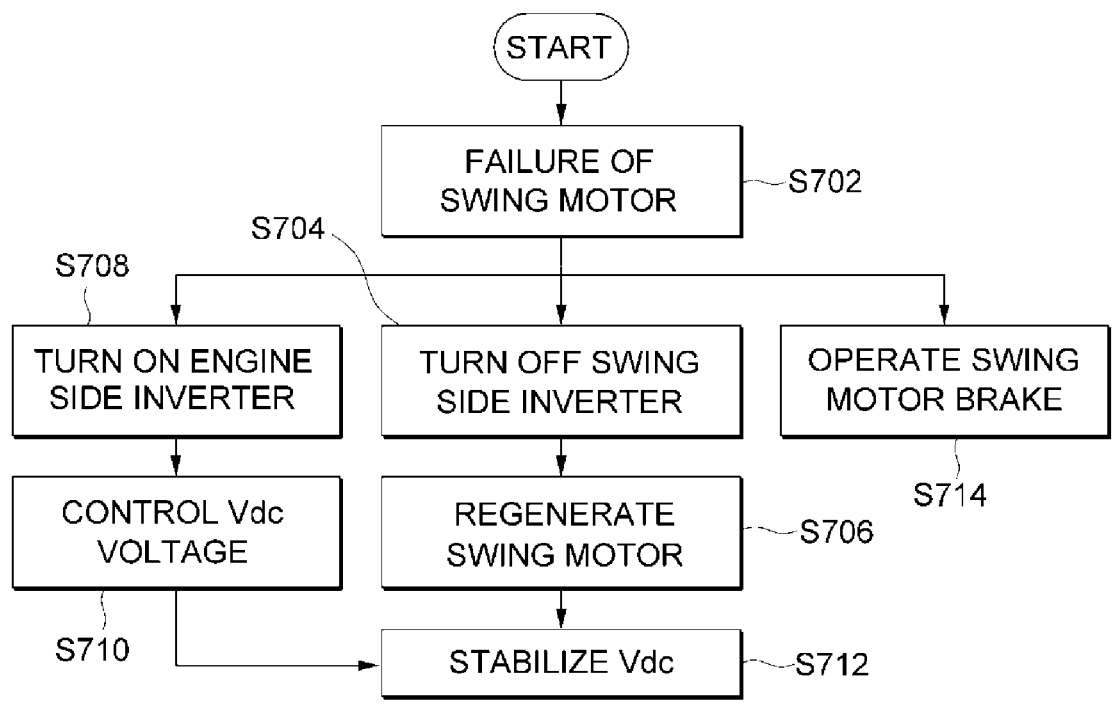

FIGS. 6 and 7 are an explanatory view and a flowchart of a second exemplary embodiment regarding an emergency stop process at the time of the swing side failure according to the present disclosure.

As illustrated in FIGS. 6 and 7, the electric power conversion device confirms that the swing side failure (failure in the swing motor 120 or the swing side inverter 121) occurs (S702).

Further, the electric power conversion device turns off the swing side inverter 121 in which failure has occurred (S704). In this case, the swing motor 120 is regenerated due to the inertial energy of the swing body (S706).

In addition, in the second exemplary embodiment that is different from FIGS. 4 and 5, the electric power conversion device turns off the ultracapacitor side converter 131, and operates the engine side inverter 111 (S708). Accordingly, the engine auxiliary motor 110 is operated as a motor that assists output of the engine.

Next, the electric power conversion device performs Vdc voltage control of the engine side inverter 111 (S710), and absorbs the inertial energy of the swing body using the engine auxiliary motor 110. Accordingly, the electric power conversion device stabilizes Vdc (S712).

Meanwhile, in order to reduce time for deceleration of the swing body, the electric power conversion device may operate the mechanical hydraulic brake, which is provided in the swing motor 120, so as to allow the swing body to be stopped (S714).

Figure 8:
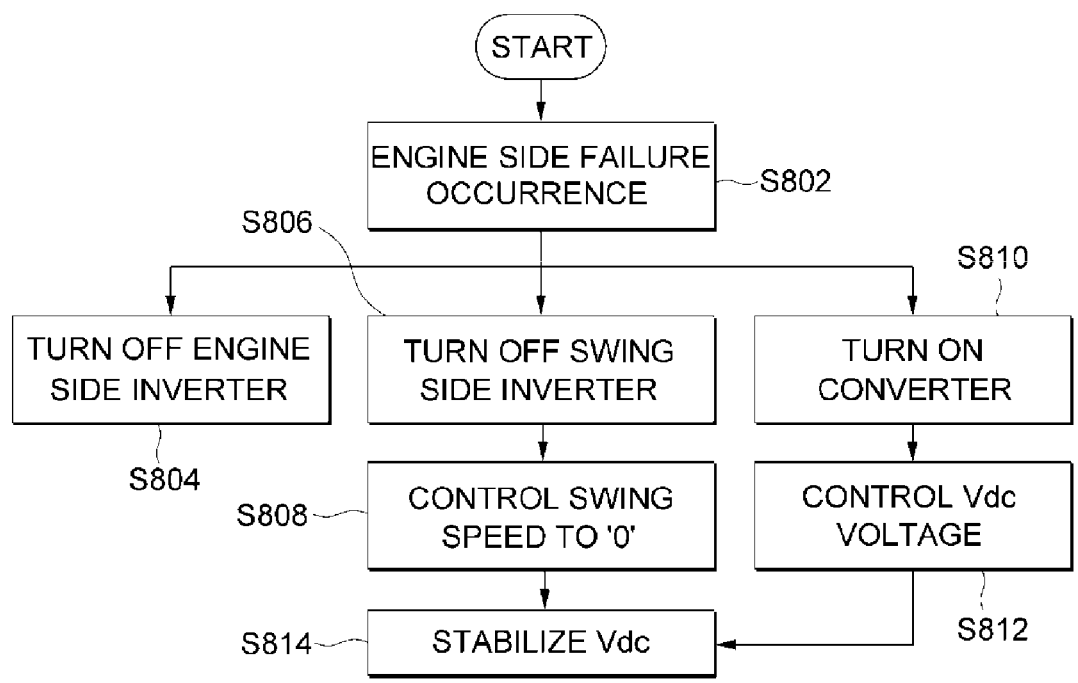
FIG. 8 is a flowchart of the first exemplary embodiment regarding an emergency stop process at the time of engine side failure according to the present disclosure.
Figure 9:
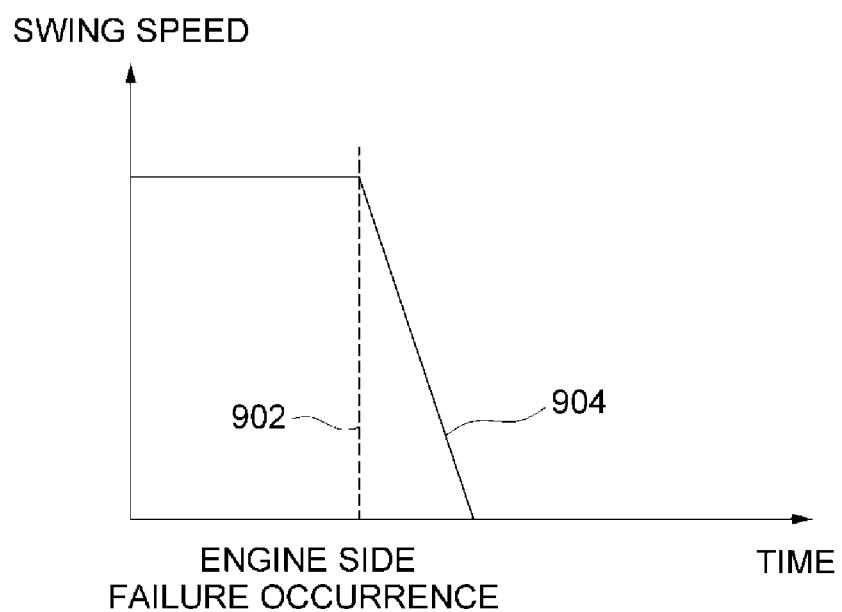
FIG. 9 is an exemplified view of the first exemplary embodiment regarding a swing speed at the time of engine side failure according to the present disclosure.

FIG. 8 is a flowchart of the first exemplary embodiment regarding an emergency stop process at the time of the engine side failure according to the present disclosure, and FIG. 9 is an exemplified view of the first exemplary embodiment regarding a swing speed at the time of the engine side failure according to the present disclosure.

As illustrated FIG. 8, the electric power conversion device confirms that the engine side failure (failure in the engine auxiliary motor 110 or the engine side inverter 111) occurs (S802).

Further, the electric power conversion device turns off the engine side inverter 111 in which failure has occurred (S804).

In addition, in the first exemplary embodiment, the electric power conversion device operates the swing side inverter 121 (S806). Next, the electric power conversion device controls the swing speed to be '0' (S808).

Meanwhile, the electric power conversion device operates the ultracapacitor side converter 131 (S810). Further, the electric power conversion device performs Vdc voltage control of the ultracapacitor side converter 131 (S812).

Accordingly, the electric power conversion device absorbs the inertial energy of the swing body while stabilizing Vdc (S814).

As illustrated in FIG. 9, at a failure occurrence time point 902, the inertial energy is stored in the ultracapacitor 130 through the ultracapacitor side converter 131. Therefore, the swing speed of the swing body is slowed down with a gradient indicated by reference numeral 904.

Figure 10:
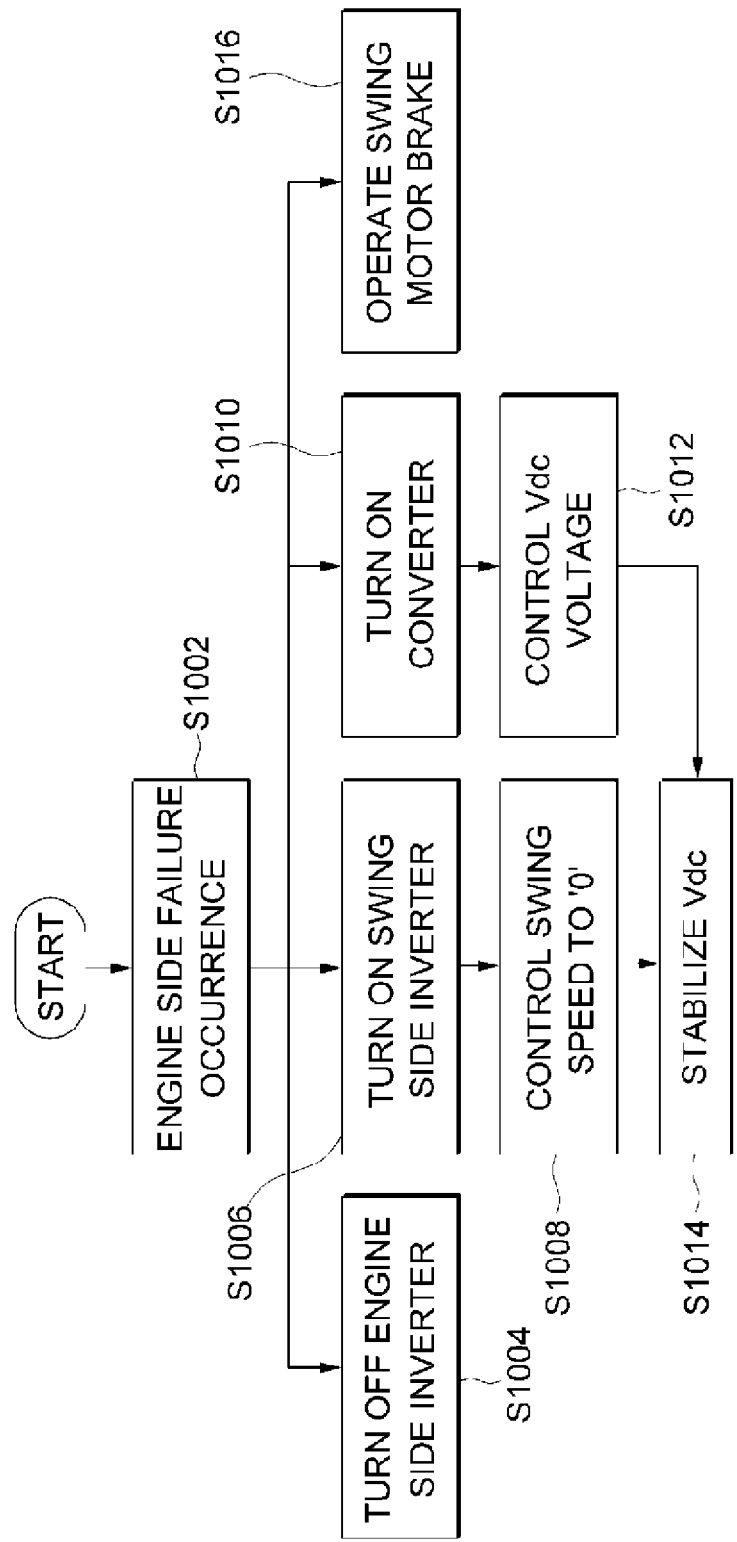
FIG. 10 is a flowchart of the second exemplary embodiment regarding an emergency stop process at the time of engine side failure according to the present disclosure.
Figure 11:
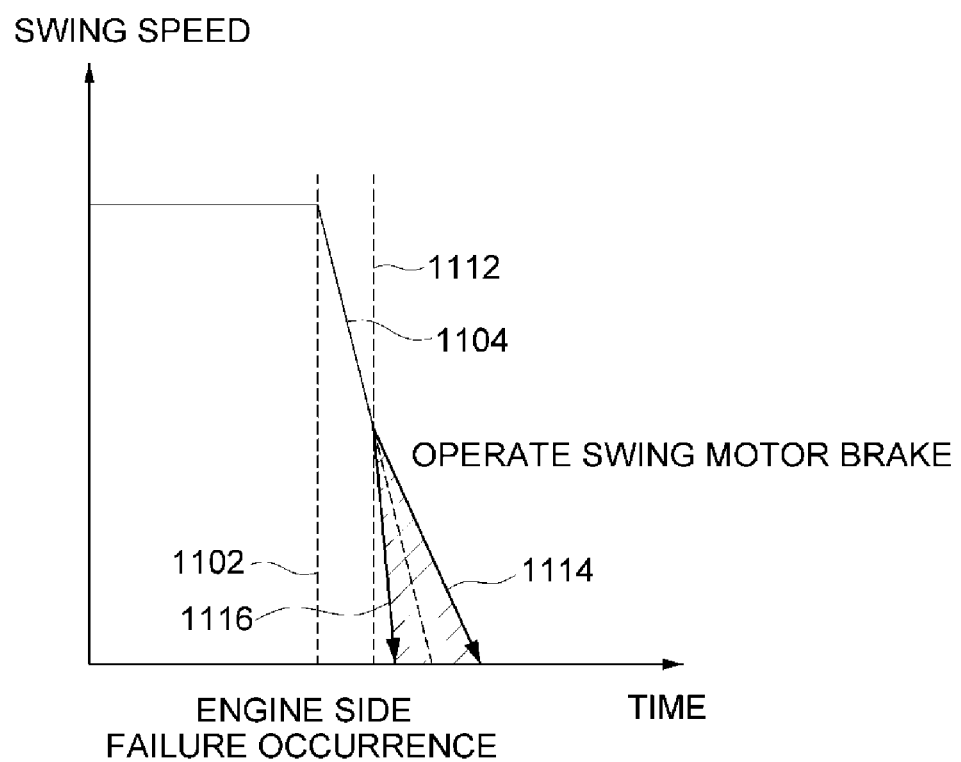
FIG. 11 is an exemplified view of the second exemplary embodiment regarding a swing speed at the time of engine side failure according to the present disclosure.

FIG. 10 is a flowchart of the second exemplary embodiment regarding an emergency stop process at the time of the engine side failure according to the present disclosure, and FIG. 11 is an exemplified view of the second exemplary embodiment regarding a swing speed at the time of the engine side failure according to the present disclosure.

As illustrated FIG. 10, the electric power conversion device confirms that the engine side failure (failure in the engine auxiliary motor 110 or the engine side inverter 111) occurs (S1002).

Further, the electric power conversion device turns off the engine side inverter 111 in which failure has occurred (S1004).

In addition, the electric power conversion device operates the swing side inverter 121 (S1006). Next, the electric power conversion device controls the swing speed to be '0' (S1008).

Meanwhile, the electric power conversion device operates the ultracapacitor side converter 131 (S1010). Further, the electric power conversion device performs Vdc voltage control of the ultracapacitor side converter 131 (S1012).

Accordingly, the electric power conversion device absorbs the inertial energy of the swing body while stabilizing Vdc (S1014).

In the second exemplary embodiment, in order to reduce time for deceleration of the swing body, the electric power conversion device may operate the mechanical hydraulic brake, which is provided in the swing motor 120, so as to allow the swing body to be stopped (S1016).

As illustrated in FIG. 11, at a failure occurrence time point 1102, the inertial energy is stored in the ultracapacitor 130 through the ultracapacitor side converter 131, and the swing speed is slowed down in a shape having a gradient 1104. In this case, a time point 1112 at which the ultracapacitor 130 is fully charged may occur.

In a case in which the ultracapacitor 130 is fully charged, the inertial energy of the swing body is no longer stored in the ultracapacitor 130, and thus the swing speed of the swing body may be slowed down in a shape having a more gradual gradient 1114.

However, when the mechanical hydraulic brake, which is provided in the swing motor 120, is operated in order to reduce time for deceleration of the swing body, in the electric power conversion device, the swing speed may be slowed down in a shape having a steeper gradient 1116.

Figure 12:
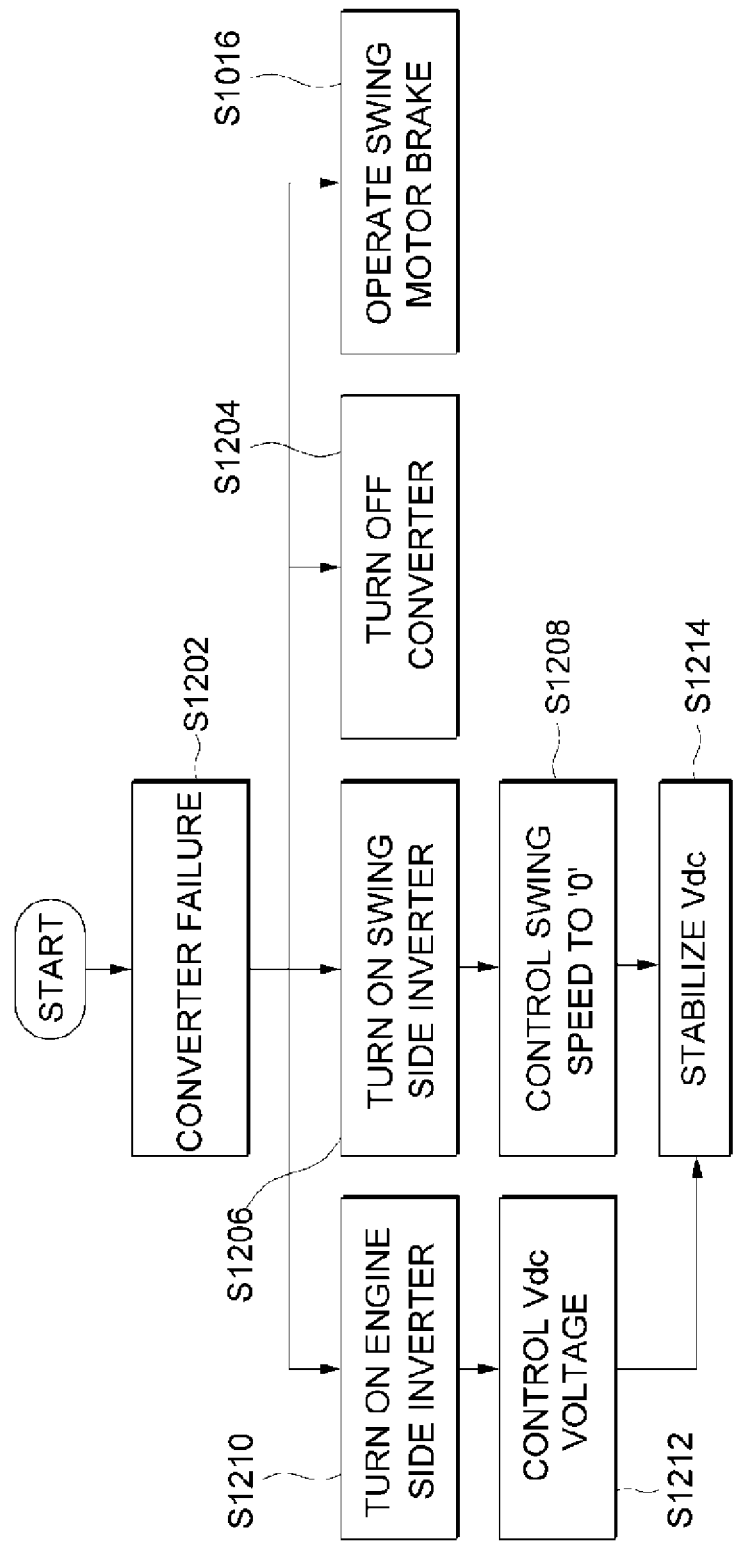
FIG. 12 is a flowchart of the exemplary embodiment regarding an emergency stop process at the time of ultracapacitor side failure according to the present disclosure.
Figure 13:
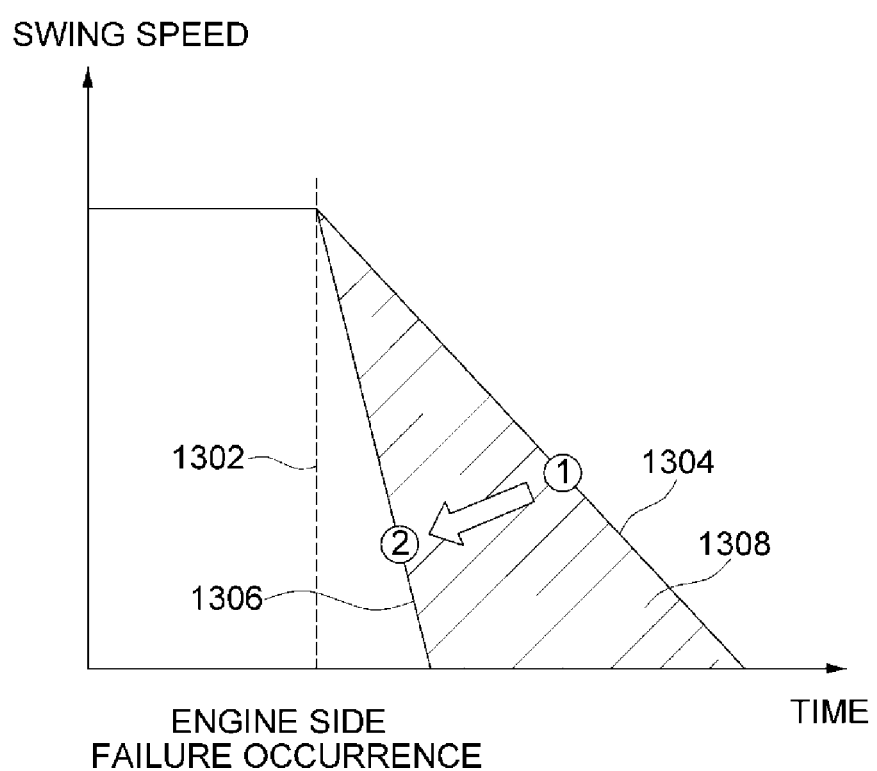
FIG. 13 is an exemplified view of the exemplary embodiment regarding a swing speed at the time of ultracapacitor side failure according to the present disclosure.

FIG. 12 is a flowchart of the exemplary embodiment regarding an emergency stop process at the time of the ultracapacitor side failure according to the present disclosure, and FIG. 13 is an exemplified view of the exemplary embodiment regarding a swing speed at the time of the ultracapacitor side failure according to the present disclosure.

As illustrated in FIG. 12, the electric power conversion device confirms that the ultracapacitor side failure (failure in the ultracapacitor 130 or the ultracapacitor side converter 131) occurs (S1202).

Further, the electric power conversion device turns off the ultracapacitor side converter 131 in which failure has occurred (S1204).

In addition, the electric power conversion device operates the swing side inverter 121 (S1206). Next, the electric power conversion device controls the swing speed to be '0' (S1208).

Meanwhile, the electric power conversion device operates the engine side inverter 111 (S1210). Accordingly, the engine auxiliary motor 110 is operated as a motor that assists engine output of the engine. Further, the electric power conversion device performs Vdc voltage control of the engine side inverter 111 (S1212).

Accordingly, the electric power conversion device absorbs the inertial energy of the swing body while stabilizing Vdc (S1214).

Meanwhile, in order to reduce time for deceleration of the swing body, the electric power conversion device may operate the mechanical hydraulic brake, which is provided in the swing motor 120, so as to allow the swing body to be stopped (S1216).

As illustrated in FIG. 13, at a failure occurrence time point 1302, the inertial energy is consumed by the engine auxiliary motor 110 through the swing side inverter 121 and the engine side inverter 111.

In general, the inertial energy of the swing body has larger capacity than the inverter 111 of the engine auxiliary motor 110, and thus the electric power conversion device cannot quickly decelerate the swing body with a gradient indicated by reference numeral 1306, but may stop the swing body in an emergency manner with a gradient indicated by reference numeral 1304.

In order to supplement the aforementioned operations, when the electric power conversion device operates the mechanical hydraulic brake, which is provided in the swing motor 120, in order to reduce time for deceleration of the swing body, the swing body may decelerate in a shape having a gradient in a steeper region 1308.

Meanwhile, in the case of failure such as overvoltage, by which all electric power conversion devices cannot be operated, the electric power conversion device allows the swing body to be stopped by only using the mechanical hydraulic brake provided in the mechanical swing motor 120.

Meanwhile, in a case in which the swing body is stopped in an emergency manner due to failure, the electric power conversion device may display a failure occurrence location and an emergency stop matter to a user through a monitoring device.

Meanwhile, a brake control device of construction equipment at the time of an emergency stop according to the present disclosure will be described with reference to FIGS. 14 to 17.

Figure 14:
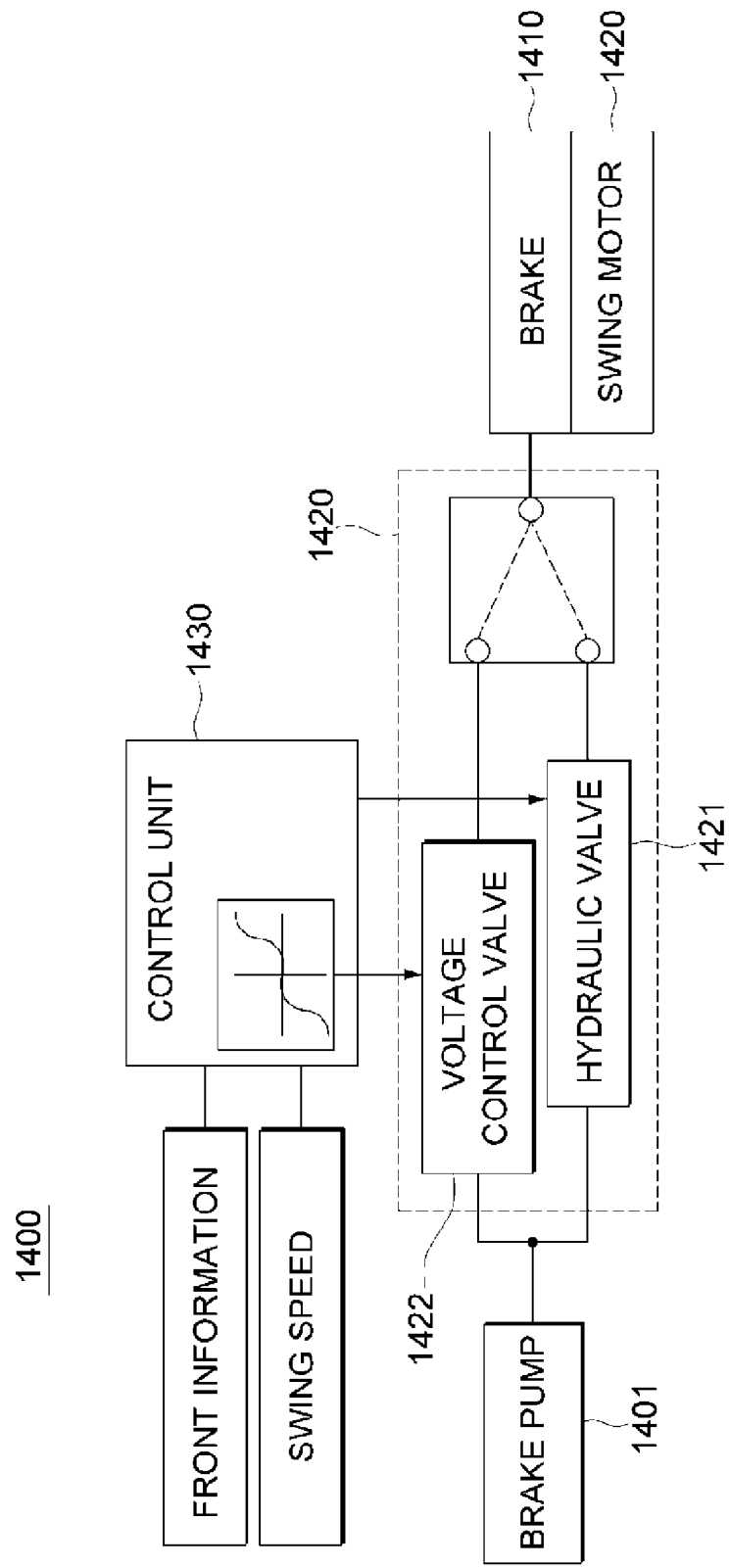
FIG. 14 is a configuration diagram of an exemplary embodiment of a brake control device according to the present disclosure.

FIG. 14 is a configuration diagram of an exemplary embodiment of a brake control device according to the present disclosure.

As illustrated in FIG. 14, the brake control device includes a brake 1410, a drive valve 1420, and a control unit 1430. The drive valve 1420 may be a hydraulic valve 1421 or a voltage control valve (electronic proportional pressure reducing (EPPR) valve) 1422.

The brake control device 1400 controls the brake in two ways.

Firstly, in a case in which the drive valve 1420 is the hydraulic valve 1421, the brake control device 1400 applies a control signal in a pulse width modulation (PWM) manner to the hydraulic valve 1421 so as to determine a brake pattern.

Secondly, in a case in which the drive valve 1420 is the voltage control valve 1422, the brake control device 1400 determines the brake pattern depending on a predetermined stop speed profile.

The brake pattern is determined using a speed or front information of the swing motor 120, and the brake control device 1400 controls the drive valve 1420 in accordance with the brake pattern.

Hereinafter, constituent elements of the brake control device of the construction equipment will be described, respectively.

The brake 1410 allows the swing body to be stopped. The brake 1410 is connected with the swing motor 120.

The drive valve 1420 operates the brake 1410 in a hydraulic manner or a voltage controlled manner. The drive valve 1420 may be the hydraulic valve 1421 or the voltage control valve 1422. The drive valve 1420 may adjust an amount or pressure of fluid discharged to the brake 1410 from a brake pump 1401 that is connected with the drive valve 1420.

The control unit 1430 determines the brake pattern using the front information or the swing speed of the swing body. That is, the control unit 1430 needs to change the brake pattern depending on a size of inertial energy of the swing body. The control unit 1430 receives an input swing speed of the swing motor 120, and selects or calculates the brake pattern using the swing speed and the front information of the swing body. Here, states of a boom, an arm, a bucket, and the like are included in the front information in a case in which the construction equipment is an excavator, but the front information is not limited to front information of specific construction equipment. The control unit 1430 may select any one brake pattern among a plurality of brake patterns that is precalculated. In addition, the control unit 1430 may calculate the brake pattern by reflecting the swing speed and the front information to a predefined brake function.

Further, the control unit 1430 creates a voltage control signal or a hydraulic pressure control signal of the drive valve 1420 depending on the determined brake pattern, and controls the drive valve 1420 so that the swing body is stopped.

Figure 15:
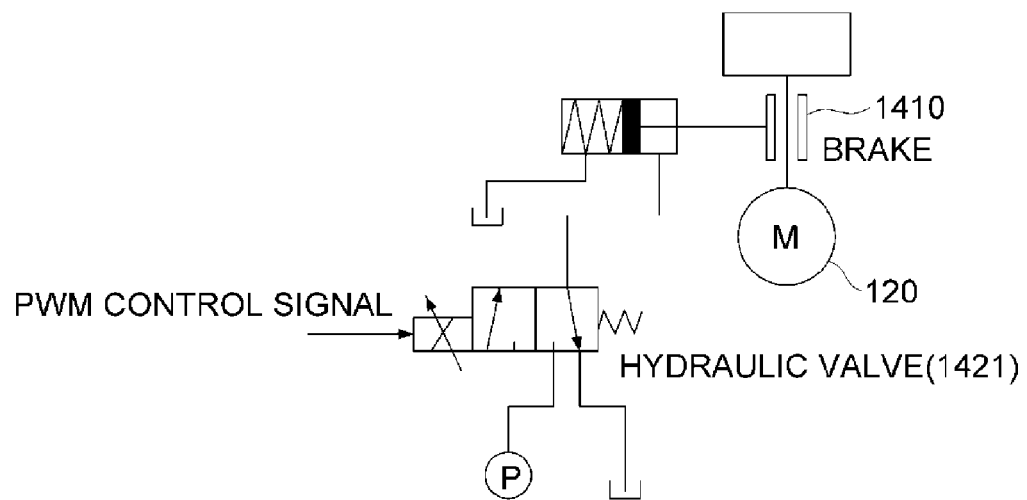
FIG. 15 is a configuration diagram of a first exemplary embodiment of the brake control device according to the present disclosure.

FIG. 15 is a configuration diagram of the first exemplary embodiment of the brake control device according to the present disclosure.

As illustrated in FIG. 15, in a case in which the drive valve 1420 is the hydraulic valve 1421, the hydraulic valve 1421 adjusts an amount of fluid, which is discharged from the brake pump 1401 for operating the brake 1410 connected with the swing motor 120, in a hydraulic manner.

In a case in which the drive valve 1420 is the hydraulic valve 1421, the control unit 1430 creates the brake pattern in the pulse width modulation manner using the front information or the swing speed of the swing body. Here, the control unit 1430 may change a pressure period of the brake by adjusting a duty ratio per pulse that is turned on/off in the pulse width modulation manner.

Further, the control unit 1430 controls the drive valve 1420, which is the hydraulic valve 1421, depending on a hydraulic pressure control signal of the created pulse width modulation manner.

Figure 16:
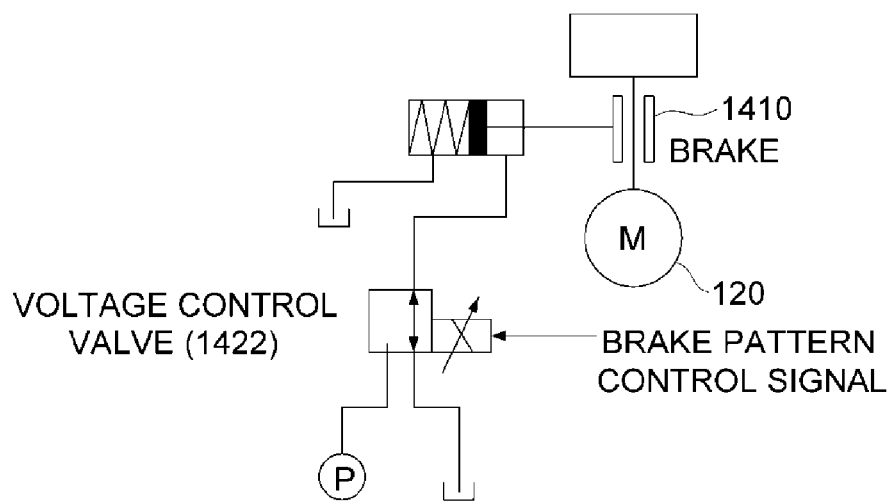
FIG. 16 is a configuration diagram of a second exemplary embodiment of the brake control device according to the present disclosure.

FIG. 16 is a configuration diagram of the second exemplary embodiment of the brake control device according to the present disclosure.

As illustrated in FIG. 16, in a case in which the drive valve 1420 is the voltage control valve 1422, the voltage control valve 1422 adjusts an amount of fluid, which is discharged from the brake pump 1401 for operating the brake 1410 connected with the swing motor 120, in a voltage controlled manner.

In a case in which the drive valve 1420 is the voltage control valve 1422, the control unit 1430 creates the brake pattern in the voltage controlled manner using the front information or the swing speed of the swing body. Here, the control unit 1430 may create the brake pattern using brake pattern characteristics that may be designated by the brake pressure with respect to brake input. The brake pattern characteristics may be preset by the user, and stored in the brake control device 1400 in advance.

Further, the control unit 1430 controls the drive valve 1420, which is the voltage control valve 1422, depending on a created hydraulic pressure control signal by the voltage control manner.

Figure 17:
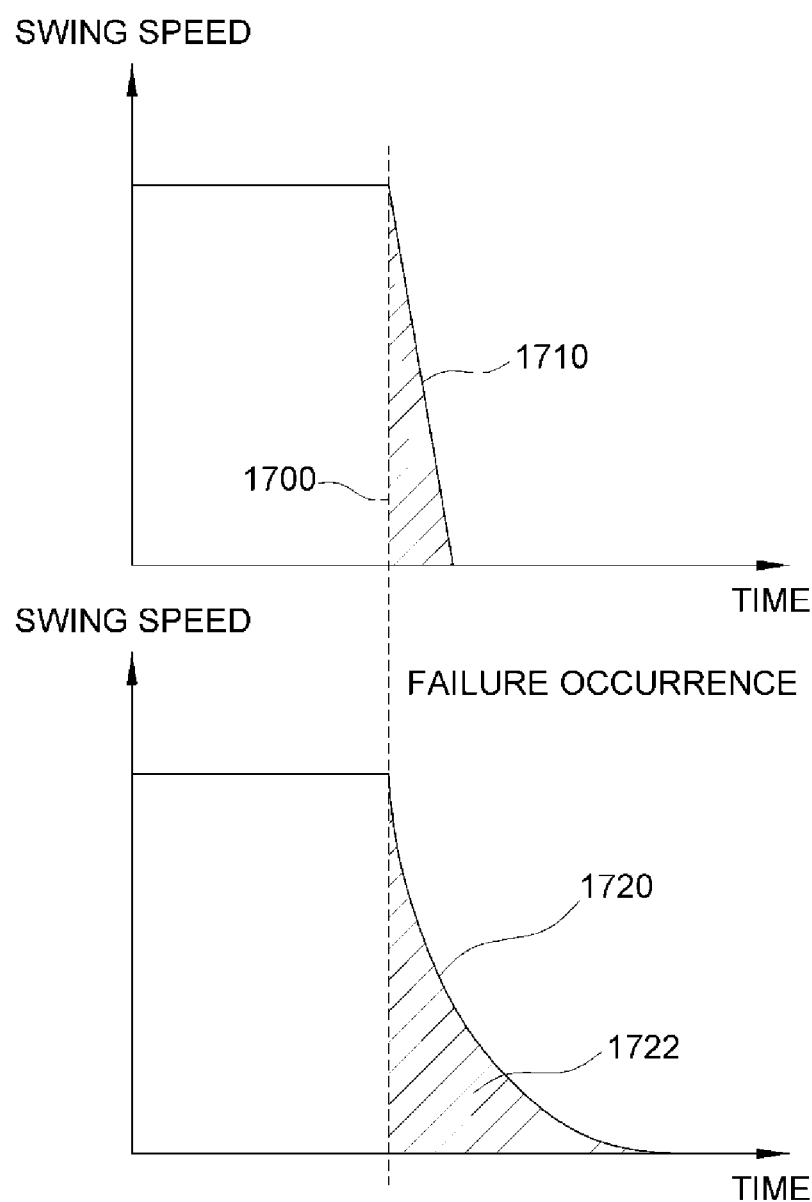
FIG. 17 is an exemplified view of an exemplary embodiment of deceleration speed graphs of swing speeds in a case in which the brake control device according to the present disclosure is applied.

FIG. 17 is an exemplified view of the exemplary embodiment regarding a deceleration speed graph of the swing speed in a case in which the brake control device according to the present disclosure is applied.

As illustrated in FIG. 17, the brake control device 1400 sets the brake patterns so that the brake patterns are varied depending on a size of the inertial energy of the swing body. The brake control device 1400 may select or calculate the brake pattern using the measured swing speed or the front information of the swing body.

A graph in which the swing body is changed to a stopped state on the basis of the failure occurrence time point 1700 is illustrated in FIG. 4.

An upper end swing speed profile 1710 refers to a swing speed in a case in which the swing body is immediately stopped. A lower end swing speed profile 1720 refers to a swing speed that is slowed down depending on the brake pattern of the present disclosure.

The user may directly receive impact due to the hydraulic brake 1410 in the upper end swing speed profile 1710. In addition, there is a risk that the construction equipment is turned over in a case in which the construction equipment is placed on a slope.

In the lower end swing speed profile 1720, a swing speed after failure occurs in the construction equipment is illustrated. Here, area (integration) 1722 until the swing speed becomes '0' is a movement distance of the swing body. In the lower end swing speed profile 1720, a rotational distance of the swing body may be more increased than the upper end swing speed profile 1710 when the swing body is immediately stopped depending on a stop speed profile.

From the foregoing, it will be appreciated that the exemplary embodiments of the present disclosure have been described herein for purposes of illustration, and that various modifications may be made by those skilled in the art without departing from the scope and spirit of the present disclosure. The exemplary embodiments disclosed in the specification of the present disclosure will not limit the present disclosure. The scope of the present disclosure will be interpreted by the claims below, and it will be construed that all techniques within the scope equivalent thereto belong to the scope of the present disclosure.

The invention claimed is:

1. A brake control device for hybrid construction equipment, comprising:
   a brake configured to stop a swing body when failure occurs in the hybrid construction equipment;
   a drive valve which is formed hydraulically or electrically, and configured to control pressure or an amount of fluid applied to the brake; and
   a control unit configured to:
   determine a brake pattern using front information or a swing speed of the swing body; and
   control the drive valve while creating a voltage control signal or a hydraulic pressure control signal so that the swing body is stopped depending on the determined brake pattern.

2. The brake control device of claim 1, wherein the drive valve is a hydraulic valve, and wherein the control unit is further configured to:
   create the brake pattern with a pulse width modulation using the front information or the swing speed of the swing body; and
   control the drive valve in accordance with a hydraulic pressure control signal of the created pulse width modulation.

3. The brake control device of claim 1, wherein the drive valve is a voltage controlled valve, and wherein the control unit is further configured to:
   create the brake pattern depending on a predetermined stop speed profile using the front information or the swing speed of the swing body; and
   control the drive valve in accordance with the created voltage control signal.

* * * * *